(12) United States Patent
Agent et al.

(10) Patent No.: US 6,228,505 B1
(45) Date of Patent: May 8, 2001

(54) MEDIUM DENSITY POLYETHYLENE FILM HAVING UNIDIRECTIONAL TEAR

(75) Inventors: Rhonda Rogers Agent, Rochester; John A. Larter, Canandaiqua, both of NY (US); Hans Joachim Pip, Arlon (BE)

(73) Assignee: Mobil Oil Corporation, Fairfax, VA (US)

( * ) Notice: Subject to any disclaimer, the term of this patent is extended or adjusted under 35 U.S.C. 154(b) by 0 days.

(21) Appl. No.: 09/132,606

(22) Filed: Aug. 11, 1998

Related U.S. Application Data

(63) Continuation-in-part of application No. 09/079,087, filed on May 15, 1998.

(51) Int. Cl.[7] .............................. B32B 27/08; B29C 47/06
(52) U.S. Cl. ......................... 428/516; 428/518; 428/520; 264/177.19; 264/173.11; 264/171.1; 264/212; 264/288.8; 264/290.2
(58) Field of Search ...................................... 428/516, 518, 428/520; 264/172.19, 173.11, 171.1, 212, 288.8, 290.2

(56) References Cited

U.S. PATENT DOCUMENTS

| | | | | |
|---|---|---|---|---|
| 4,929,303 | * | 5/1990 | Sheth | 156/209 |
| 5,084,352 | * | 1/1992 | Percec | 428/412 |
| 5,851,655 | * | 4/1999 | O'Brien | 428/213 |
| 5,885,721 | * | 3/1999 | Su | 428/516 |

* cited by examiner

*Primary Examiner*—Leszek Kiliman
(74) *Attorney, Agent, or Firm*—Dennis P. Santini; T. Dean Simmons

(57) ABSTRACT

The present invention is directed to biaxially oriented polymeric films. Specifically, the present invention is directed to biaxially oriented polyethylene films having unidirectional tear characteristics in machine direction and method thereof. The film of the present invention consists of (1) a core layer of medium density polyethylene (MDPE) and optionally a cavitating agent; and (2) at least one skin layer on at least one surface of the core layer. The skin layer is also made from a polyethylene. The core and skin layers coextensively adhere to one another and are biaxially oriented in both machine and traverse directions.

10 Claims, No Drawings

MEDIUM DENSITY POLYETHYLENE FILM HAVING UNIDIRECTIONAL TEAR

This application is a continuation-in-part of copending U.S. application Ser. No. 09/079,807 filed on May 15, 1998 now pending.

BACKGROUND OF THE INVENTION

The present invention is directed to biaxially oriented polymeric films. Specifically, the present invention is directed to biaxially oriented polyethylene films having unidirectional tear characteristics in machine direction and methods thereof.

Polymeric films are widely used in many industrial applications. One particularly important application is the food packaging industry. Films employed in the food packaging industry are chosen to provide characteristics necessary for proper food containment. Polymeric films used for food packaging, however, usually do not have tear propagation in the film plane in one well-defined direction. For example, non-oriented polymeric films such as polypropylene (PP) or polyethylene (PE) films are difficult to tear in any direction. If a tear is made on a package of non-oriented polymeric film, the tear propagates in an uncontrolled way across the package, and destroys the entire package.

Bioriented high density polyethylene (HDPE) or polypropylene films have easy tear propagation in both machine and transverse directions. Packages produced with these bioriented polyolefins are easy to open if a tear is initiated by a notch in the pack (typically in the seal area). However, these films are not without disadvantages. Tear propagation of these films is uncontrolled. That is, if a tear is made on a package of the polymeric films, the tear propagates in an uncontrolled way across the package and the entire package is destroyed.

MD oriented polymeric films have also been developed to give controlled tearing properties in one direction. For example, Monax films manufactured by Tredegar provide controlled tear in machine direction. However, the production of MD oriented film is limited in efficiency, as only relative narrow web width can be produced and thickness uniformity is generally poor.

In addition, oriented films that give controlled tear in transverse direction are disclosed in U.S. Pat. No. 4,870,122, issued Sep. 26, 1989 to Lu; U.S. Pat. No. 4,916,025, issued Apr. 10, 1990 to Lu; and U.S. Pat. No. 5,223,346, issued Jun. 29, 1993 to Lu. These films have controlled opening in transverse direction, and thus have, unfortunately, inherent sensitivities in web resistance against tearing when the film is produced, converted, or used in packaging applications.

As a result, there exists a continuing need for bioriented films having controlled tear properties, while maintaining uniform optical properties, good mechanical properties in both machine and transverse directions, high production output with a large web to assure good material efficiencies, and uniform thickness.

It is therefore an object of the present invention to provide a biaxially oriented film which exhibits excellent unidirectional tear properties in the machine direction.

It is therefore an object of the present invention to provide a biaxially oriented film which exhibits uniform optical properties.

It is therefore an object of the present invention to provide a biaxially oriented film which exhibits good mechanical properties in both machine and transverse directions and uniform film thickness.

It is therefore an object of the present invention to provide a biaxially oriented film which exhibits high production output with a large web to assure good material efficiencies.

For a better understanding of the present invention, together with other and further objects, reference is made to the following description and its scope will be pointed out in the appended claims.

SUMMARY OF THE INVENTION

The present invention is a biaxially oriented film having unidirectional tear characteristics in machine direction and a method for making the film. The film consists of (1) a core layer of medium density polyethylene (MDPE) and optionally a cavitating agent; and (2) at least one skin layer co-extensively adhered to at least one surface of the core layer. The core and skin layers are biaxially oriented in both machine and traverse directions.

Examples of the skin layer can be, but are not limited to, ethylene-propylene (EP) copolymer, ethylene-propylene butene (EPB) terpolymer, MDPE having a density of from about 0.90 to about 0.97, preferably MDPE having a density of from about 0.92 to about 0.95, and most preferably MDPE having a density of from about 0.935 to about 0.945.

Examples of the cavitating agent can be, but are not limited to, polystyrene, polyacrylate, polyester, polyamide, cross-linked polymeric particulates, and calcium carbonate ($CaCO_3$), preferably, polystyrene, cross-linked polyacrylate powder, and $CaCO_3$, and most preferably $CaCO_3$.

In another preferred embodiment of the present invention, the laminated film further includes at least one tie layer co-extensively adhered to at least one surface of the skin layer.

Examples of the tie layer can be, but are not limited to, high density polyethylene (HDPE), MDPE, low density polyethylene (LDPE), preferably HDPE and MDPE, and most preferably MDPE.

The present invention is also a method for providing films with unidirectional tear properties which consists of forming a coextruded laminated film having (1) a core layer of medium density polyethylene (MDPE) and optionally a cavitating agent; and (2) at least one skin layer. The core and skin layers co-extensively adhere to each other and are biaxially oriented in both machine and traverse directions. The laminated film can further include at least one tie layer coextensively adhered to at least one surface of the skin and/or core layers.

As a result, the present invention advantageously provides laminated films having tear propagation exclusively in machine direction, and uniform opacity when cavitated. Additionally, the laminated films of the present invention have tear resistance in transverse direction, and thus making the web resistant against tearing in all production and converting operations. The resultant films also exhibit high degree of machinability, processability, and thickness uniformity resulting in better quality film and reduced manufacturing costs.

DETAILED DESCRIPTION OF THE INVENTION

The present invention is directed to biaxially oriented polymeric films. Specifically, the present invention is directed to biaxially oriented polyethylene films having unidirectional tear characteristics in machine direction and method thereof.

The film of the present invention consists of (1) a core layer of medium density polyethylene (MDPE) and optionally a cavitating agent; and (2) at least one skin layer coextensively adhered thereto. The core and skin layers are biaxially oriented in both machine and transverse directions.

The amount of MDPE in the base layer prior to casting the polyethylene sheet should be an amount sufficient to yield a base layer in the film having a thickness from about 0.4 mil to about 3.0 mil, preferably from about 0.6 mil to about 2.0 mil, and most preferably from about 0.75 mil to about 1.5 mil (1 mil=0.001 inch=100 gauge). The thickness value provided herein does not account for additional thickness resulting from cavitation.

The term "medium density polyethylene" (MDPE) as used herein is defined to mean an ethylene-containing polymer having a density of from about 0.910 to about 0.950, preferably from about 0.925 to about 0.945, and most preferably from about 0.930 to about 0.945. Some commercially available MDPE include Dowlex™ 2038 or Dowlex™ 2027A from The Dow Chemical Company.

The present invention also includes at least one skin layer on at least one surface of the core layer. The skin layer can be applied to the core layer by any methods known in the art.

The skin layer has a thickness from about 0 mil to about 0.4 mil, preferably from about 0.02 mil to about 0.3 mil, and most preferably from about 0.03 mil to about 0.2 mil (1 mil=0.001 inch=100 gauge).

Examples of the skin layer can be, but are not limited to, EP copolymer, EPB terpolymer, MDPE having a density of from about 0.90 to about 0.97, preferably MDPE having a density of from about 0.92 to about 0.95, and most preferably MDPE having a density of from about 0.935 to about 0.945.

In one preferred embodiment of the present invention, the laminated film is a cavitated MDPE film. The cavitated film is produced by biaxially orienting in a solid state a coextruded laminated sheet having (1) a core layer of MDPE containing therein a cavitating agent and (2) at least one skin layer adhered to at least one surface of the core layer.

The core layer can include MDPE with a cavitating agent. Such agents are typically added to the core or base layer prior to extrusion and are capable of generating voids (cavities) in the structure of the film during the film-making process. It is believed that small inhomogeneities introduced into the core layer by the cavitating agent result in points of weakness in the polyethylene sheet. The biaxial orienting steps then induce voids in the core layer, causing cavitation in the processed film. The voids in the core layer vary in size and are formed not only horizontally, i.e., within or parallel to the plane of the film, but also in the vertical dimension or perpendicular to the plane of the film.

Any suitable cavitating agent known in the art can be used in the present invention. Examples of the cavitating agent can be, but are not limited to, polystyrene, polyacrylate, polyester, polyamide, cross-linked polymeric particulates, and calcium carbonate ($CaCO_3$), preferably, polystyrene, cross-linked polyacrylate powder, and $CaCO_3$, and most preferably $CaCO_3$. Organic cavitating agents such as polyamide and polystyrene can be used, but are generally less preferred due to their limited operating temperature range. However, such organic cavitants may be useful if they are extremely finely divided and are either resistant to melt at operating temperatures or produce a suitable inhomogeneity in the polyethylene sheet. Cavitating agents can be included in the films of the present invention by any methods known in the art.

The amount of cavitating agent in the MDPE core layer of the present invention is from about 0 to 50% by weight, preferably from about 2% to about 25% by weight and most preferably from about 4% to about 15% by weight.

The resultant film of the present invention has a thickness from about 0.5 mil to about 3 mil, preferably from about 0.6 mil to about 2 mil, and most preferably from about 0.9 mil to about 1.5 mil (1 mil=0.001 inch=100 gauge). The thickness value provided herein does not account for additional thickness resulting from cavitation.

The resultant films of the present invention can be used in food packaging. The films of the present invention can eliminate the use of a tear tape in food packages. That is, when one or two parallel notches are present in the machine direction, a tear can be initiated at one or at both notches and continue in a straight line or two parallel lines, through the whole structure of the film in a controlled way down the machine direction without the use of a tear tape.

The present invention is also a method for providing films with unidirectional tear properties which consists of forming a coextruded laminated film having (1) a core layer of medium density polyethylene (MDPE) and optionally a cavitating agent; and (2) at least one skin layer of medium density polyethylene. The core and skin layers co-extensively adhere to each other and are biaxially oriented in both machine and transverse directions.

The films of the present invention can be produced by the methods using conventional casting apparatus. For example, cast extrusion is generally accomplished using a standard multi-roll stack system or a cast roll with an air cap (high velocity air applied to the outside of the sheet). Other casting apparatus is also useful, such as a cast roll and water bath system.

A polyethylene film prepared according to the present invention is biaxially oriented. Biaxial orientation is employed to evenly distribute the strength qualities of a film in the longitudinal or "machine direction" (MD) of the film and in the lateral or "transverse direction" (TD) of the film. Biaxially oriented films tend to be stiffer and stronger, and also exhibit much better resistance to flexing and folding forces, leading to greater utility in packaging applications.

Biaxial orientation can be conducted simultaneously in both directions, however, it is expensive to employ apparatus having the ability to do this. Therefore, most biaxial orientation processes use apparatus which stretches the film sequentially, first in one direction and then in the other. A typical apparatus will stretch a film in the MD first and then in the TD. The degree to which a film can be stretched is dependent upon factors including, for example, the polymer from which a film is made.

A film according to the present invention is made from polyethylene and optionally, a cavitating agent and can be stretched to a relatively high degree. In particular, a film can be stretched in the MD to a degree of from about 3:1 to about 8:1, preferably from about 4.5:1 to about 6.5:1, and most preferably from about 5:1 to about 6:1, and in the TD to a degree of from about 6:1 to about 15:1, preferably from about 7:1 to about 12:1, and most preferably from about 8:1 to about 10:1.

Stretching of the MDPE sheet of the present invention is carried out under lower stretch temperatures than for the conventional HDPE sheets, typically about 1 to 20° F. The stretch temperatures for machine direction are from about 220° F. to about 270° F., preferably from about 230° F. to about 260° F., and most preferably from about 240° F. to about 260° F.

Stretch temperatures in transverse direction are such that the film reaches prior to stretching, a uniform average temperature of 230° F. to about 275° F., preferably from about 240° F. to about 270° F. and most preferably from about 245° F. to about 265° F.

In the preferred embodiment of the present invention, the film structures have an MDPE core layer containing $CaCO_3$ and an MDPE skin layer on each surface of the core layer. The MDPE skin outer layer has excellent adhesion, and provides excellent casting and good slip performance. The MDPE skin layer also generates a semi-matte surface appearance and gives the film a soft touch.

The presence of the cavitating agent in the core layer generates cavitation during stretching and reduces the film density in the resultant films, which in turn reduces light transmission. Pigmentation can also be used in place of cavitation in the films to achieve whiteness and some light barrier. In this case, the film density will be higher than MDPE density. The films of the present invention can also be produced as a transparent web.

In another preferred embodiment of the present invention, the laminated film further includes at least one tie layer co-extensively adhered to at least one surface of the skin layer. The tie layer can be applied to the core layer by any methods known in the art. The tie layer can be interposed between the core and the skin layers or between the skin layers. The tie layer can also be deposited on the outer surface of the skin layer.

Examples of the tie layer can be, but are not limited to, HDPE, MDPE, and LDPE, preferably HDPE and MDPE, and most preferably MDPE.

The tie layer of the present invention has a thickness from about 0.05 mil to about 0.3 mil, preferably from about 0.06 mil to about 0.2 mil, and most preferably from about 0.09 mil to about 0.15 mil.

In order to further improve certain properties of the resultant film, effective amounts of additives such as pigments, antiblocking agents, antistatic agents or slip agents may be blended in the core layer, skin layer, and/or tie layer.

Suitable pigments include, but are not limited to, $TiO_2$, carbon black, graphite, mica, and metallic powders.

Suitable antiblocking agents include, but are not limited to, silica, talc, clay, sodium aluminum silicate, and conventional organic and inorganic anti-blocks.

Suitable antistatic agents include, but are not limited to, alkali alkane sulfonates and essentially straight-chain, saturated aliphatic tertiary amines, and hydroxylated amines.

Suitable slip agents include, but are not limited to, aliphatic acid amides, aliphatic acid esters, waxes, metallic soaps, and polydimethylsiloxanes.

The resultant films of the present invention can further be corona or flame treated or may be coated to improve wettability of the film and ink receptivity. The coating may provide heat seal or cold seal properties or additional barrier properties. Conventional methods may be used to coat these films.

EXAMPLES

A series of experiments was performed to illustrate features and advantages of the present invention. Several of the manufacturing conditions were common to each case. For example, a polyethylene sheet was cast at a temperature between 150–180° F. depending upon the thickness of the sheet, i.e., the caster temperature was higher for thicker sheets. In addition, orientation was performed using conventional orienting equipment in each case. Further, each film was stretched in the machine direction at a temperature about 245–270° F. and in the transverse direction at about 260° F.

Examples 1 to 5

When MDPE was used in the cavitated core layer instead of HDPE, the bioriented film exhibits an unidirectional tear in machine direction. This means, a tear initiated along the direction of film production and winding propagates only in this direction. A tear initiated in transverse direction, i.e., perpendicular to film production and winding direction does not propagate in this direction but naturally, the tear follows a direction of propagation in machine direction (MD).

Example 1

A MDPE core layer using a resin of 0.935 and MI=1 was co-extruded with 2 MDPE skin layers using a resin having a density of 0.938, melt index (MI) of 2.5 and casted to provide a MDPE sheet. The MDPE sheet was stretched in the machine direction at 260° F. and in the transverse direction at 262° to produce a clear biaxially oriented film with unidirectional tear in the MD properties. The MDPE sheet had a yield of 25,225 $in^2$/lb.

Example 2

A MDPE core containing 6% $CaCO_3$ was co-extruded with 2 MDPE skin layers using the same PE resins in EXAMPLE 1 and casted to provide a MDPE sheet. The MDPE sheet was stretched in the machine direction at 260° F. and in the transverse direction at 262° F. to produce an opaque biaxially oriented film with unidirectional tear in the MD properties. The MDPE sheet had a yield of 26,911 $in^2$/lb.

Example 3

A MDPE core using the same resin as EXAMPLES 1 and 2 containing 6% $CaCO_3$ was co-extruded with 2 MDPE skin layers using a resin having a density of from about 0.935, melt index (MI) of 1 and casted to provide a MDPE sheet. The MDPE sheet was stretched in the machine direction at 250° F. and in the transverse direction at 260° F. to produce an opaque biaxially oriented film with unidirectional tear in the MD properties. The MDPE sheet had yield of 25,859 $in^2$/lb.

Example 4

A HDPE core using resin having a density of 0.958 and a MI of 1.0, and containing 6% $CaCO_3$ was coextruded with the skin layers of Example 1 to produce a HDPE sheet. The HDPE sheet was stretched in the MD at 270° F. and in the TD at 262° F. The HDPE sheet exhibited no unidirectional tear, and has a yield of 22,847 $in^2$/lb.

Example 5

A HDPE core using resin having a density of 0.958 and a MI of 0.45, and containing 6% $CaCO_3$ was coextruded with the skin layers of Example 1 to produce a HDPE sheet. The HDPE sheet was stretched in the MD at 270° F. and in the TD at 260° F. The HDPE sheet exhibited no unidirectional tear, and has a yield of 23,514 $in^2$/lb.

Example 6

A HDPE core layer was coextruded with 2 MDPE skin layers used in Ex. 1 to produce a sheet. The density of the HDPE resin was 0.958 and a MI of 1.0.

The sheet was stretched in the MD direction at 270° F. and in the TD direction at 260° F. The HDPE sheet exhibited no unidirectional tear and has a yield of 22,715 in$^L$/lb.

TABLE 1

| First Outer Layers Ex. (17 g each) | Core Layers | Sample Reference | Results |
|---|---|---|---|
| 1 MDPE | MDPE | PLRRA11197-01 | MD tear, no TD tear |
| 2 MDPE | MDPE + 7% CaCO$_3$ | PLRRA11197-02 | MD tear, no TD tear |
| 3 MDPE | MDPE + 7% CaCO$_3$ | PLRRA11197-03 | MD tear, no TD tear |
| 4 MDPE | HDPE + 7% CaCO$_3$ | PLRRA11197-04 | MD tear and TD tear |
| 5 MDPE | HDPE + 7% CaCO$_3$ | PLRRA11197-05 | MD tear and TD tear |
| 6 MDPE | HDPE | PLHPO9227-02 | MD tear and TD tear |

Table 1 above shows comparative film structures exhibiting unidirectional tear properties in MD or not. Film samples with MDPE in the core layer, with or without CaCO3, exhibit unidirectional tear in MD. Film samples with an HDPE core layer show tear propagation in MD and in TD direction. MDPE used in the core layer was Dowlex 2038. MDPE in the skin layers is the same material for Example 3 (PLRRA11197-03) and a blend of Dowlex 2038 and Dowlex 2027A (50/50) for all other samples. HDPE used in Examples 4 (PLRRA11197-04) and 6 (PLHPO9227-02) is Equistar M6211 and for Example 5 (PLRRA11197-05), it is Exxon HDZ128.

Thus, while there have been described what are presently believed to be the preferred embodiments of the present invention, those skilled in the art will realize that various changes and modifications may be made to the invention without departing from the spirit of such invention. All such changes and modification which fall within the scope of the invention are therefore intended to be claimed.

What is claimed is:

1. A laminate film comprising:
   (1) a core layer of medium density polyethylene, and optionally a cavitating agent selected from the group consisting of polystyrene, polyamide, polyester, polyacrylate, cross-linked polymeric particulates, and calcium carbonate; and
   (2) at least one skin layer on at least one surface of said core layer, said skin layer is a polymer selected from the group consisting of ethylene-propylene copolymer, ethylene-propylene-butylene terpolymer, and medium density polyethylene,
   wherein said core layer and said skin layer are coextensively adhered to each other and are biaxially oriented in both machine and traverse directions to produce a film having tear propagation in the machine direction and tear resistance in the transverse direction.

2. The laminated film according to claim 1, wherein said cavitating agent is calcium carbonate.

3. The laminated film according to claim 1, wherein said skin layer is medium density polyethylene.

4. The laminated film according to claim 1 comprises at least one tie layer coextensively adhered to at least one surface of said skin layer and/or core layer.

5. The laminated film according to claim 4, wherein said tie layer is a polymer selected from the group consisting of high density polyethylene, medium density polyethylene, and low density polyethylene.

6. A method of producing a laminate film comprising:
   forming a coextruded laminated film having:
      (1) a core layer of medium density polyethylene, and optionally a cavitating agent selected from the group consisting with polystyrene, polyamide, polyester, polyacrylate, cross-linked polymeric particulates, and calcium carbonate; and
      (2) at least one skin layer of a polymer selected from the group consisting of medium density polyethylene, ethylene propylene copolymer, and ethylene-propylene-butylene terpolymer coextensively adhered to said core layer; and
   biaxially orienting said coextruded laminated film in both machine and traverse directions to obtain a laminated film having tear propagation in the machine direction and tear resistance in the transverse direction.

7. The method according to claim 6, wherein said cavitating agent is calcium carbonate.

8. The method according to claim 6, wherein said skin layer is medium density polyethylene.

9. The method according to claim 6 further comprises at least one tie layer coextensively adhered to at least one surface of said skin layer and/or core layer.

10. The method according to claim 3, wherein said tie layer is a polymer selected from the group consisting of high density polyethylene, medium density polyethylene, and low density polyethylene.

* * * * *